(12) United States Patent
Steiner et al.

(10) Patent No.: US 10,788,104 B2
(45) Date of Patent: Sep. 29, 2020

(54) DRIVE APPARATUS WITH SUPERPOSITION GEARBOX

(71) Applicant: VOITH PATENT GMBH, Heidenheim (DE)

(72) Inventors: Stefan Steiner, Schillingsfuerst (DE); Tobias Stolz, Satteldorf (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/321,191

(22) PCT Filed: Jul. 14, 2017

(86) PCT No.: PCT/EP2017/067828
§ 371 (c)(1),
(2) Date: Jan. 28, 2019

(87) PCT Pub. No.: WO2018/019612
PCT Pub. Date: Feb. 1, 2018

(65) Prior Publication Data
US 2019/0178351 A1 Jun. 13, 2019

(30) Foreign Application Priority Data

Jul. 26, 2016 (DE) .................. 10 2016 213 639
Feb. 23, 2017 (DE) .................. 10 2017 103 698

(51) Int. Cl.
*F16H 37/06* (2006.01)
*F16H 3/72* (2006.01)
*F16H 57/04* (2010.01)

(52) U.S. Cl.
CPC ........... *F16H 3/727* (2013.01); *F16H 37/065* (2013.01); *F16H 57/0436* (2013.01);
(Continued)

(58) Field of Classification Search
CPC .... F16H 3/727; F16H 37/065; F16H 57/0436; F16H 57/0441; F16H 57/0484
See application file for complete search history.

(56) References Cited

U.S. PATENT DOCUMENTS 4,018,105 A * 4/1977 Walker ................. F16H 37/065
74/665 GE
4,182,199 A * 1/1980 Watson ................. B60K 17/28
74/606 R
(Continued)

FOREIGN PATENT DOCUMENTS

DE        612823 A      4/1935
DE   102014210870 A1   12/2015
(Continued)

*Primary Examiner* — Patrick H Mackey
(74) *Attorney, Agent, or Firm* — Laurence A. Greenberg; Werner H. Stemer; Ralph E. Locher

(57) ABSTRACT

A drive apparatus includes a superposition gear with a planetary gear train. A main drive machine is connected to an input shaft of the superposition gear. Two auxiliary drives are each connected with the planetary gear train via a drive connection. An output shaft of the superposition gear may be connected to a work machine. The planetary gear train has a ring gear, a sun gear, a planet carrier and a plurality of planetary gears. These drive connections of the auxiliary drives are respectively established via a sprocket chain, each of which has a stepped idler gear.

18 Claims, 5 Drawing Sheets

(52) U.S. Cl.
CPC ..... *F16H 57/0441* (2013.01); *F16H 57/0484* (2013.01); *F16H 2200/2005* (2013.01)

(56) References Cited

U.S. PATENT DOCUMENTS

| | | | |
|---|---|---|---|
| 7,270,030 B1* | 9/2007 | Belloso | B60K 5/08 |
| | | | 74/661 |
| 8,287,413 B2* | 10/2012 | Besnard | B60K 6/365 |
| | | | 475/5 |
| 2002/0094898 A1* | 7/2002 | Hata | B60L 58/40 |
| | | | 475/5 |
| 2003/0100395 A1 | 5/2003 | Hiraiwa | |
| 2008/0227576 A1* | 9/2008 | Besnard | B60K 6/365 |
| | | | 475/5 |
| 2010/0262322 A1 | 10/2010 | Yokouchi et al. | |
| 2013/0075183 A1* | 3/2013 | Kochidomari | B60K 7/0007 |
| | | | 180/292 |
| 2018/0138836 A1 | 5/2018 | Lauter et al. | |

FOREIGN PATENT DOCUMENTS

| | | |
|---|---|---|
| DE | 102014225738 A1 | 6/2016 |
| DE | 102015107934 A1 | 11/2016 |
| WO | 2016172742 A1 | 11/2016 |

* cited by examiner though the planet carrier is driven via a gear step, this arrangement offers the advantage that power is primarily transmitted via the ring gear, so that the gears may be optimized in terms of performance and the gear step in the planet carrier drive may be used in terms of speed. Alternatively, however, it is of course also possible to connect the input shaft with the planet carrier, the output shaft with the sun gear, and the auxiliary drives with the ring gear via a respective drive connection at a constant gear ratio.

DRIVE APPARATUS WITH SUPERPOSITION GEARBOX

BACKGROUND OF THE INVENTION

Field of the Invention

The invention relates to a drive apparatus comprising a superposition gear with a planetary gear, a main drive machine connected to an input shaft of the superposition gear, two auxiliary drives that are each connected to the planetary gear train via a drive connection, an output shaft of the superposition gear, which can be connected to a work machine wherein the planetary gear has a ring gear, a sun gear, a planet carrier and a plurality of planetary gears.

In a superposition gear generally at least two shafts of the planetary gear train are driven by mutually independent drives, so that the rotational speeds are added to or subtracted from those of a different shaft, the output shaft. If one of the drives is controllable, then the rotational speed of the output shaft may be controlled continuously. In the present case, two shafts are driven, one shaft being driven by the main drive machine and one shaft being driven by the two speed-controllable auxiliary drives. A work machine is connected to the third shaft, the output shaft.

Drive apparatuses are known from the prior art that have a superposition gear, in which a main drive machine drives the ring gear of a planetary gear train via the input shaft and a controllable auxiliary drive drives the planet carrier via a gear step, while the work machine is connected to the sun gear via the output shaft. By means of such a drive apparatus, the rotational speed at the output shaft may be adjusted continuously over a fairly wide speed range, even while the main drive machine is running constantly.

In addition, it is possible to run the main drive machine without load, as the auxiliary drive supplies the rotational speed of the main drive machine at each startup. The load is gradually increased by reducing the auxiliary drive's compensation of the rotational speed only when the main drive machine is near the rated speed and can thus apply a high torque.

A specific embodiment with two auxiliary drives is shown for example in DE 102015107934 A1. Here, as has been customary in such apparatuses with planetary gear trains, the drive shaft of the main drive machine is axially flush with the output shaft.

Such drive apparatuses are used in particular to drive high-output pumps, condensers or compressors, such as are used for example in the oil and gas industry or in thermal power plants. Depending on the application and individual case, very different requirements apply with regard to the desired gear ratios and the necessary control range. For the corresponding design, the spur gears of the superposition gear, via which the auxiliary drives are integrated, are adapted in diameter to the individual case. This application-specific design is very complex and causes high costs, because the transmission must be modified accordingly.

SUMMARY OF THE INVENTION

The objective of the invention is to find an improved solution for the drive apparatus, so that it may be more easily and cost-effectively adapted to the requirements in terms of speed ratios and control range in the individual case. In particular, for retrofitting existing systems, the invention seeks to make it possible to improve efficiency in speed control at the lowest possible cost.

The objective is achieved by a drive apparatus including a superposition gear with a planetary gear, a main drive machine connected to an input shaft of the superposition gear, two auxiliary drives that are each connected to the planetary gear train via a drive connection, an output shaft of the superposition gear, which may be connected to a work machine, wherein the planetary gear has a ring gear, a sun gear, a planet carrier and a plurality of planetary gears. These drive connections of the auxiliary drives are respectively established via a sprocket chain, each of which has a stepped idler gear. Additional advantageous features of the embodiment according to the invention, which further improve the apparatus, are set forth in the corresponding dependent claims. The drive apparatus according to the invention is designed so that the drive connections between the auxiliary drives and the planetary gear train respectively take place via a sprocket chain, each with a stepped idler gear.

In this context, a stepped idler gear refers to a spur gear with two toothed areas arranged next to one another in the axial direction, which each extend over the circumference and respectively engage with various additional spur gears. Alternatively, the idler gear may also be formed by two spur gears that sit on a common short shaft. The two toothed regions or the two spur gears may have the same diameter or preferably may have different diameters.

Sprocket chain here refers to a drive connection that is established via plurality, and in particular at least two, pairs of spur gears, i.e. at least four spur gears.

Using a sprocket chain with at least one stepped spur gear results in a parallel structure of the spur gear pairs—in contrast to the structure of a sprocket chain arranged exclusively in series, in which each spur gear sits on its own shaft. Due to the parallel structure, it is possible to keep the center distances and the gearwheel diameter largely constant, and only make adaptations to one spur gear pair, in order to be able to represent any gear ratios or reduction ratios. In particular, for example, the center distances between the auxiliary drive shafts and the input shaft may remain constant, which makes it possible to keep using the same housing structure for the superposition gear train regardless of the desired gear ratio. This offers enormous simplifications and cost advantages in designing and fabricating the drive apparatus. Further corresponding improvements result from the fact that the gearwheel diameters may be kept the same except for one pair, regardless of the requirements of the individual case.

It is particularly preferred if the main drive machine may be operated only at a constant speed and the auxiliary drives may be operated at a controlled speed. This allows a more cost-effective implementation, particularly at high drive powers. The majority of the drive power may be applied by the constantly-operated main drive machine. This does not require a frequency converter, which saves on investment costs. Preferably, the main drive machine is designed as a medium-voltage motor, i.e. with a voltage of more than 1 kV. The speed control is accomplished via the auxiliary drives, which require less power and are preferably designed as low-voltage motors with a voltage of less than 1 kV. Thus, the required frequency converters are smaller and more cost-effective.

Furthermore, it is advantageous for the input shaft to be connected with the ring gear, the output shaft to be connected with the sun gear, and the auxiliary drives to be connected with the planet carrier via a respective drive connection at a constant gear ratio. An apparatus configured in this way is particularly suitable for high rotational speeds at the output, as is required for example in high-speed compressors or large fans.

For a preferred embodiment, the output shaft of the planetary gear train is also the output shaft of the superposition gear. This is particularly advantageous when the input shaft and output shaft are arranged coaxially.

In an additional preferred embodiment, a spur gear step is connected to the output shaft of the planetary gear train, and the superposition gear is connected to the output shaft via the spur gear step, in such a way that there is an axial offset between the input shaft and output shaft. Due to this axial offset, it is possible that one of the auxiliary drives may be arranged lower in the z-direction, and thus that the first and second auxiliary drives may be arranged at different heights. Although an additional gear step is provided, it has been found that significantly less space is necessary, and that there is much greater flexibility for adapting existing geometric conditions.

In addition, it is advantageous for the center of gravity of the apparatus if one of the auxiliary drives is arranged lower down. Furthermore, the apparatus according to the invention offers much more flexibility in the position of the input and output shafts, because it is now also possible to replace geared variable-speed couplings with axial offsets, without costly conversions in the periphery. Other geometric constraints in such retrofit applications may also be met more easily.

Preferably, the two auxiliary drives are located on the side of the main drive machine. The advantage is that no further space for the drive apparatus is needed on the output side, in the area of the work machine.

Alternatively, the two auxiliary drives may be arranged on the side of the output shaft, i.e. the work machine, if, for example, no suitable space is available on the side of the main drive machine.

To simplify installation and maintenance, it is advantageous if the housing is designed to be separable by a joining line and has a housing cover and a housing bottom part. Furthermore, the two auxiliary drives may be arranged directly on the housing cover, with the superposition gear and the joining line being designed such that the housing cover may be dismantled together with the two auxiliary drives, while the lower housing part may remain installed together with the main drive machine, planetary gear train and output shaft. This simplifies assembly and disassembly even further.

In an advantageous embodiment, a lubricating oil pump is present that may be driven via a spur gear on the input shaft, the spur gear preferably being arranged between the main drive machine and planetary gear train. In this way, a reliable supply of lubricating oil is assured, regardless of the rotational speed at the gearbox output. Furthermore, if appropriate openings are provided in the gearbox housing for mounting/unmounting the lubricating oil pump may be accessed from the drive side so as to be easy to maintain.

In order to enable emergency operation or a controlled shutdown in the case of a failed main drive machine, at least one additional drive connection may be provided that connects the auxiliary drives to the input shaft of the drive apparatus. And in this additional drive connection, at least one clutch is provided that is able to disengage or engage the drive connection. Further, this additional drive connection has a constant gear ratio. As a result, a majority of the energy from braking may be consumed in the auxiliary drives by re-acceleration. In this way, an unacceptable overspeed of the transmission is prevented.

Particularly preferably, an additional drive connection with a clutch may be provided for each auxiliary drive. Because two clutches are present, they can be made smaller and more cost-effectively, without there being a risk of overload when using them.

Furthermore, for low output speeds, the apparatus designed in this way may be started or operated alone with the auxiliary drives.

Particularly preferably, the respective additional drive connection is made by an auxiliary drive gear via a stepped idler gear to a spur gear on the intermediate shaft, and via this spur gear, to a spur gear on the input shaft. In this version the clutch is preferably arranged on the intermediate shaft and may disengage or engage the spur gear on the intermediate shaft.

In another preferred embodiment, the respective additional drive connection may act on a spur gear on the input shaft via an auxiliary gear that is arranged on an auxiliary drive shaft, and via an independently mounted spur gear. The clutch in this case is arranged on the auxiliary drive shaft and may engage or disengage the auxiliary gear.

Alternatively, the additional drive connection may be established, starting from the planet carrier, with two coupling wheels on the ring gear, via a separate coupling shaft. This affords the advantage that the arrangement may be made very compact and thus space-saving. Preferably, one of the two coupling wheels is attached to the coupling shaft via the clutch that is present.

In a further embodiment of the invention, the clutches are preferably arranged on a free shaft end. This offers the advantage that the control oil supply for the clutch may be provided in a very straightforward manner via an axial bore in the shaft.

BRIEF DESCRIPTION OF THE SEVERAL VIEWS OF THE DRAWING

Further advantageous embodiments of the invention that relate to exemplary embodiment will be explained with reference to the drawings. The features mentioned may not only be implemented advantageously in the illustrated combination, but also may be combined with each other individually. The drawings show, in detail.

DESCRIPTION OF THE INVENTION

Figure 1:
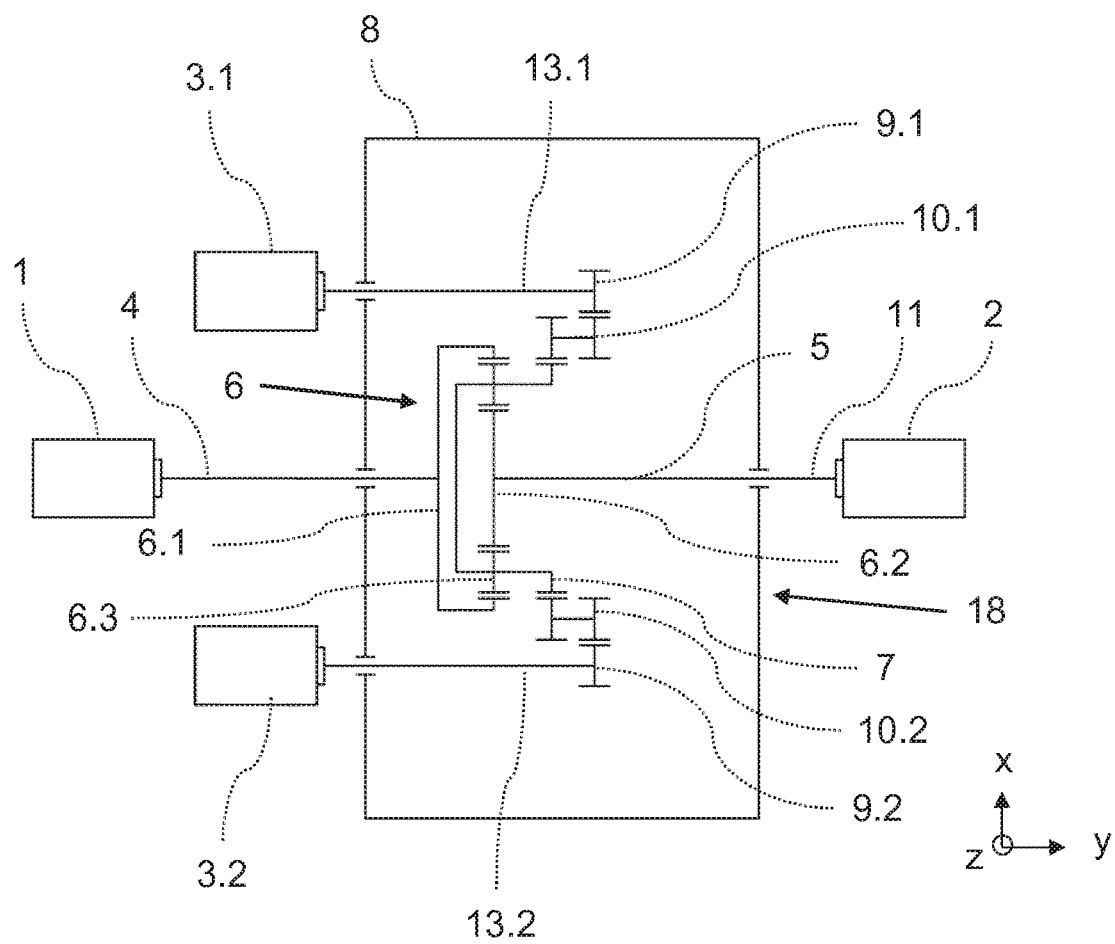
FIG. 1 Top view of a drive apparatus according to the invention having two auxiliary drives, FIG. 2 Drive apparatus according to the invention, having an additional switchable coupling between the auxiliary drive and the input shaft FIG. 3 Additional drive apparatus according to the invention with a lubricating oil pump FIGS. 4-5 Further drive apparatuses according to the invention, with additional drive connections between each respective auxiliary drive and input shaft

The figures will be described in greater detail below. Like reference numerals designate the like or analogous components or parts.

FIG. 1 shows a drive apparatus according to the invention that is connected to the work machine 2 via the output shaft 11. The work machine 2 may be, for example, a pump, a compressor, a fan or a blower. It may also be a conveyor belt drive or a mill, or a similar machine. In particular, it may be a high-power work machine 2, in which it is particularly important to have a high-efficiency drive mechanism. Due to the size of the drive, it is also crucial that the required space not be too large.

The superposition gear 18 in the drive apparatus has a housing 8, and comprises a planetary gear train 6. In the illustrated case, the output shaft 11 is formed directly by the output shaft 5 of the planetary gear train.

However, in the embodiment according to the invention, it is also possible for a spur gear step (not shown here) to be provided, which is formed from two spur gears and connects the output shaft 5 of the planetary gear train to the output shaft 11 of the drive apparatus. An axial offset between the input shaft 4 and the output shaft 11 may be implemented very flexibly, as needed, by means of the spur gear step. There may be an axial offset not only in the x-direction, but also, within limits, in the z-direction. Thus, the drive apparatus may be adapted well to existing conditions, for example when retrofitting existing systems.

The input shaft 4 connects the main drive machine 1 with the ring gear 6.1 of the planetary gear train, and the output shaft 5 is connected to the sun gear 6.2. The drive connection between the ring gear 6.1 and sun gear 6.2 is established via the planet carrier 7 having a plurality of planetary gears 6.3.

In addition, two auxiliary drives 3.1, 3.2 are provided, which are respectively connected to the planet carrier 7 via a drive connection. The fact that these drives are each connected via a separate drive connection has the advantage that the necessary gear steps and components may in this case be dimensioned smaller than when both auxiliary drives 3.1, 3.2 are connected via a common gear step. The respective drive connection takes place in this embodiment, by means of a sprocket chain, via a respective auxiliary drive gear 9.1, 9.2 that sits on the auxiliary drive shaft 13.1, 13.2, and each have a stepped idler gear 10.1, 10.2 with two toothed regions, one of which engages in the external toothing on the planet carrier 7, which is designed as a large wheel or connected to a large wheel.

A particular advantage of the design of the drive connections described here is that highly variable gear ratios are possible and yet many components, in particular the housing parts, may be kept the same, because it is not necessary to change the center distance to represent different gear ratios.

Figure 2:
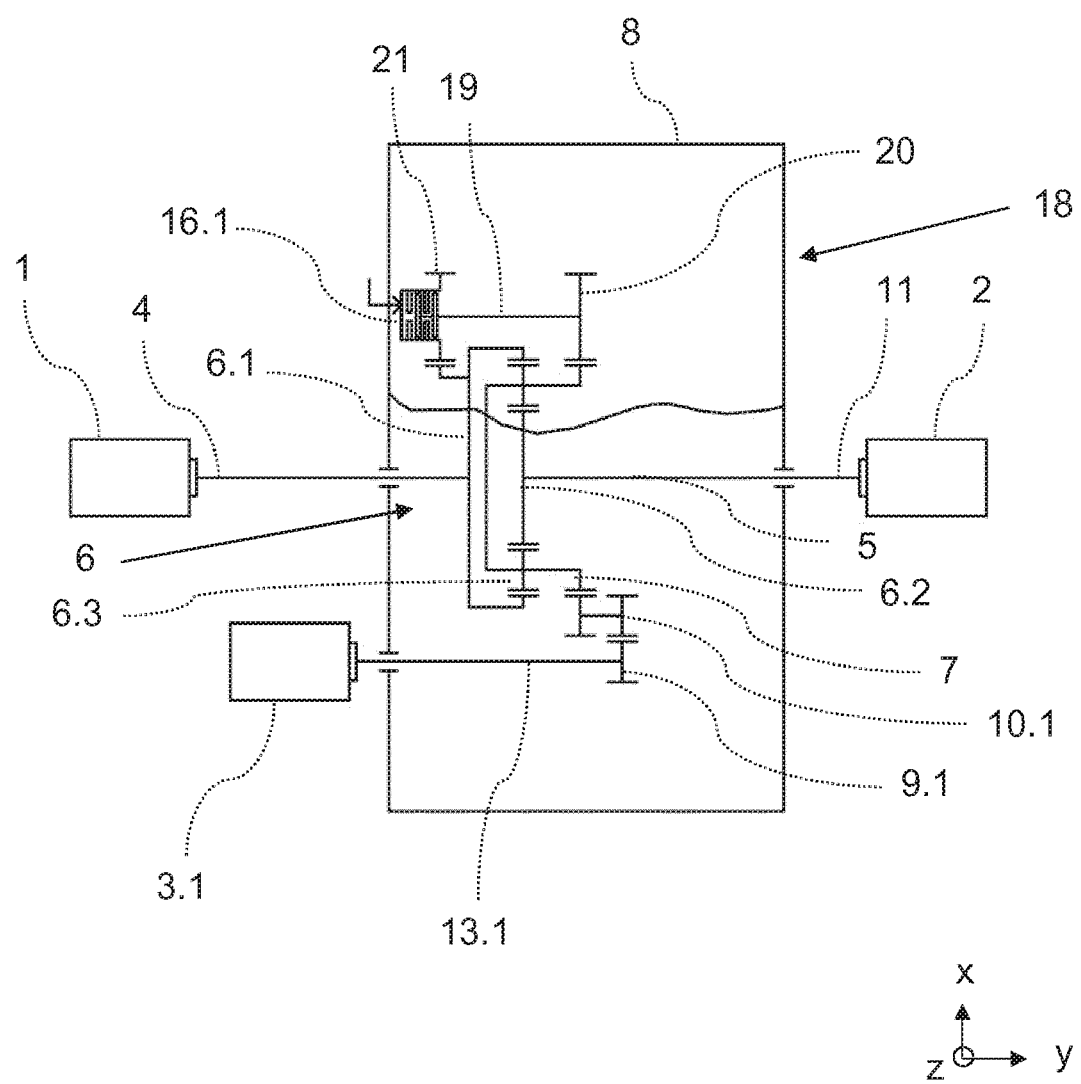

In the embodiment according to FIG. 2, there is an additional drive connection with constant gear ratio between the auxiliary drives 3.1 and input shaft 4, the connection being made indirectly. The connection runs from the planet carrier 7 to the first coupling wheel 20 and via the coupling shaft 19 to the second coupling wheel 21, which engages in a geared rim on the ring gear 6.1 of the planetary gear train 6. In this way as well, a drive connection is established between the auxiliary drives 3.1 and the input shaft 4. The drive connection between the auxiliary drive and planetary gear train—which in this case acts on the planet carrier 7—again takes place via the auxiliary drive gear 9.1 and the stepped idler gear 10.1. The clutch 16.1 is favorably located at the free shaft end of the coupling shaft, in such a way that control oil may straightforwardly be supplied via an axial bore in the shaft.

The auxiliary drives 3.1 are in turn coupled to the planet carrier 7 via the auxiliary drive gear 9.1 and the stepped idler gear 10.1. The second auxiliary drive train is not explicitly shown in this illustration.

Figure 3:
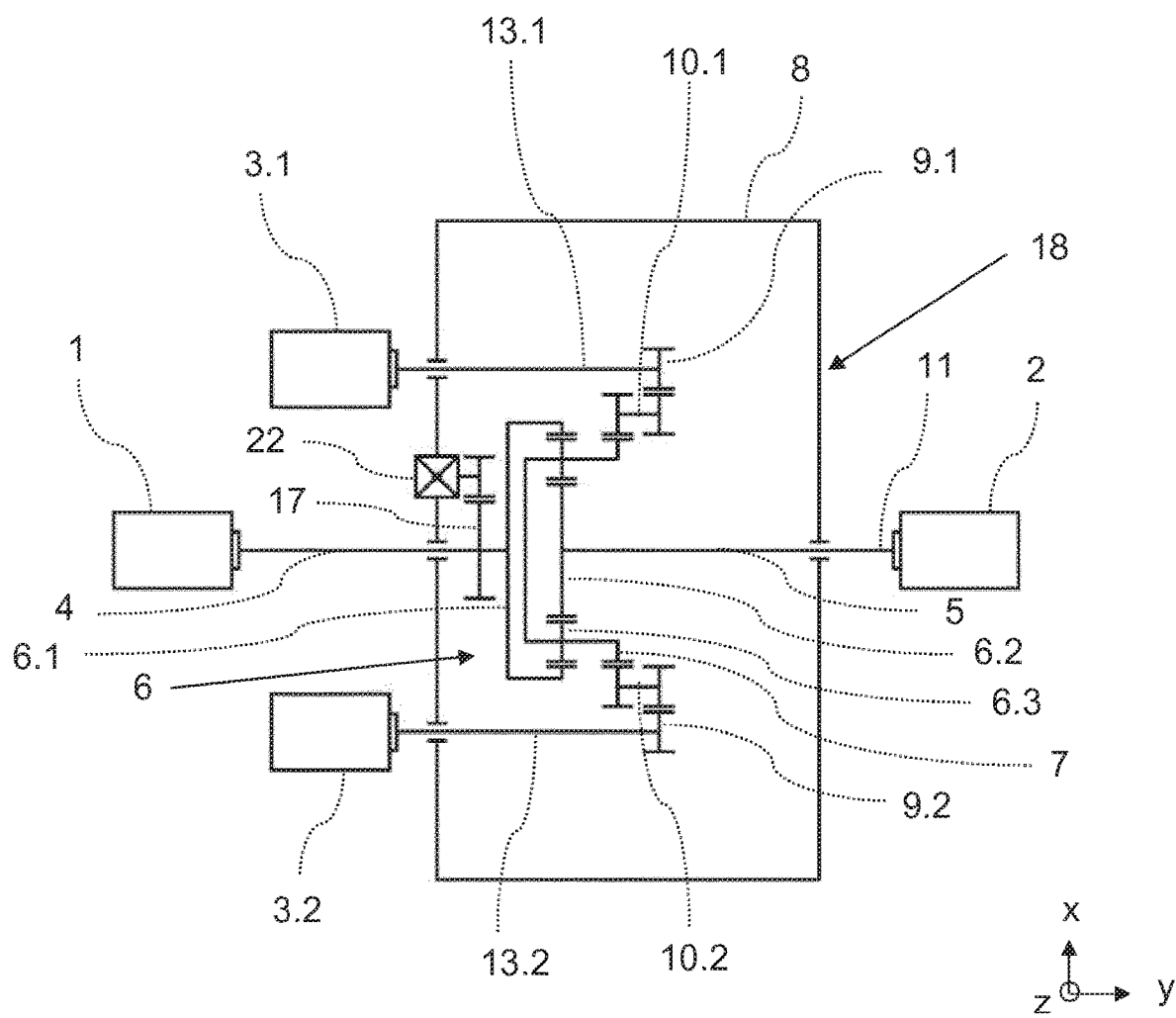

FIG. 3 shows a further embodiment of the drive apparatus according to the invention. In contrast to the embodiment shown in FIG. 1, in this case a lubricating oil pump 22 with a spur gear is still present, and this spur gear is driven via the spur gear 17 that is positioned on the input shaft between the main drive machine 1 and the ring gear 6.1 of the planetary gear train. The lubricating oil pump 22 is arranged in an opening of the gearbox housing 8, and preferably over the input shaft 4 in the upper part of the housing in the z-direction, so as to be easily maintained and accessible.

Figure 4:
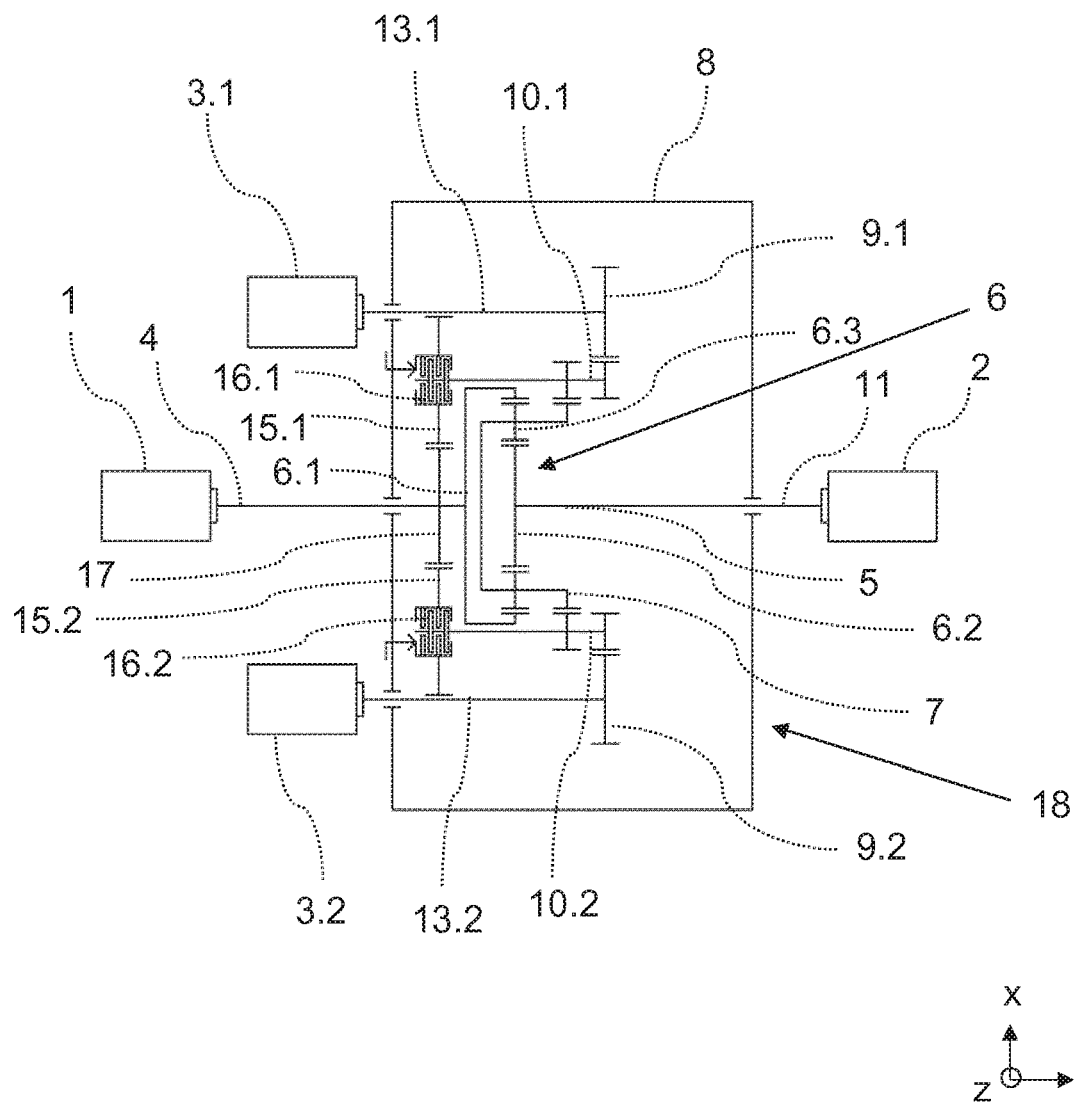
Figure 5:
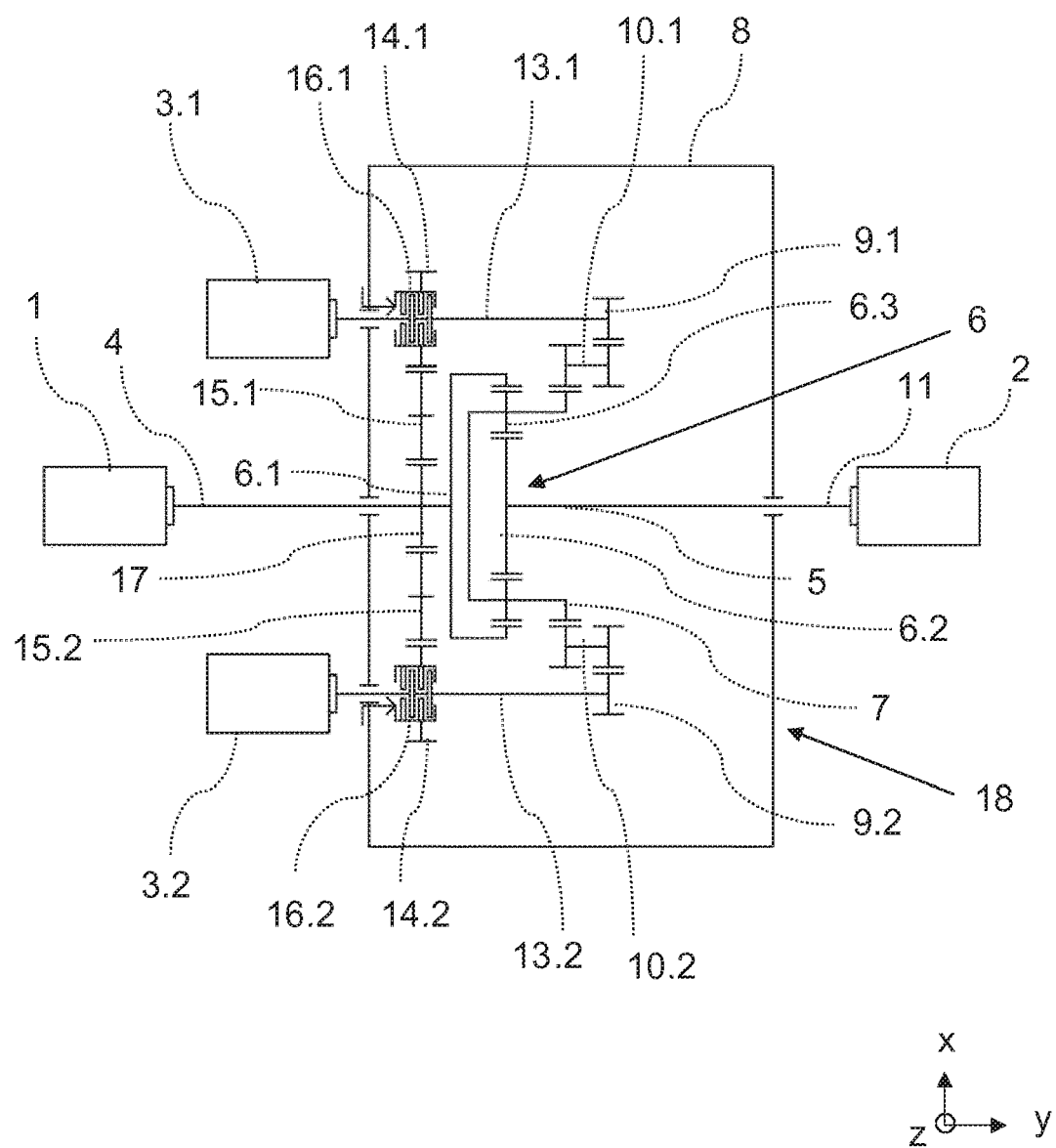

FIGS. 4 and 5 show further exemplary embodiments according to the invention; in each case, an additional drive connection is provided between the respective auxiliary drive 3.1, 3.2 and the input shaft 4. A spur gear step that is optionally present between the output shaft 5 and output shaft 11, allowing an axial offset, is again not shown explicitly, for reasons of simplification.

In each of the additional drive connections, a clutch 16.1, 16.2 is provided. Because this drive connection is also present separately for each auxiliary drive 3.1, 3.2, in turn, the clutches and other components may be designed to be smaller and thus cheaper and more space-saving. The additional drive connections between the auxiliary drives 3.1, 3.2 and the input shaft 4 are used, for example, to start the drive apparatus when the main drive machine 1 is stopped, with the aid of the auxiliary drives 3.1, 3.2, or to operate it at low rotational speed, or to enable a controlled emergency operation or controlled shutdown in the event that the main drive machine 1 fails. In both cases, it is necessary that the drive connections be able to be switched on and off, which in this case takes place via the clutches 16.1, 16.2, which may be arranged at different positions inside the drive connection. In the engaged state, the auxiliary drives are able to replace the main drive machine at low rotational speed or in emergency operation. Depending on requirements, it is possible for only one auxiliary drive to be engaged.

In FIG. 4, a variant is shown in which the clutches 16.1, 16.2 sit between the extended intermediate shaft of the stepped intermediate wheels 10.1, 10.2 and the spur gears 15.1, 15.2. The spur gears 15.1, 15.2 both engage in the spur gear 17 on the input shaft 4. The auxiliary drives 3.1, 3.2 are connected via extended auxiliary drive shafts 13.1, 13.2 and the auxiliary drive wheels 9.1, 9.2, which engage in the stepped idler gears 10.1, 10.2 on the respective intermediate shaft.

It is particularly advantageous in this embodiment that the clutches 16.1, 16.2 are arranged on a free shaft end. This allows a control oil for the clutch to be supplied via an axial bore on this free shaft end. Due to this artful arrangement that is offset in the y-direction, the drive apparatus is again particularly compact despite the additional functionalities.

In the variant shown in FIG. 5, the clutches 16.1, 16.2 sit directly on the respective auxiliary drive shaft 13.1, 13.2. The auxiliary gears 14.1, 14.2 attached to the clutch 16.1, 16.2, each engage in the idler gear 15.1, 15.2, and act on the common spur gear 17 on the input shaft 4. The advantage of this embodiment is, among other things, that no extended intermediate shafts are necessary; instead, the input shaft 4 may be acted upon directly via simple spur gear steps.

Via the different spur gear steps, the gear ratio for these additional drive connections may be adapted well to the required rotational speeds.

LIST OF REFERENCE SIGNS

1 Main drive machine
2 Work machine
3.1, 3.2 First and second auxiliary drive
4 Input shaft
5 Output shaft
6 Planetary gear train 6.1 Ring gear
6.2 Sun gear
6.3 Planetary gears
7 Planet carrier
8 Housing
9.1, 9.2 First and second auxiliary drive gear
10.1, 10.2 First and second stepped idler gear
11 Output shaft
12 Spur gear step
13.1, 13.2 First and second auxiliary drive shaft
14.1, 14.2 First and second auxiliary gear
15.1, 15.2 First and second spur gear
16.1, 16.2 First and second clutch
17 Spur gear on input shaft
18 Superposition gear
19 Coupling shaft
20 First coupling wheel
21 Second coupling wheel
22 Lubricating oil pump with spur gear
x Width
y Length
z Height direction

The invention claimed is:

1. A drive apparatus, comprising:
a superposition gear having a planetary gear train, an input shaft and an output shaft;
said output shaft configured to be connected to a work machine;
said planetary gear train having a ring gear, a sun gear, a planet carrier and a plurality of planetary gears;
a main drive machine connected to said input shaft of said superposition gear;
two auxiliary drives;
drive connections each connecting a respective one of said auxiliary drives to said planetary gear train, said drive connections of said auxiliary drives each being established through a respective sprocket chain each having a stepped idler gear;
one additional drive connection with a constant gear ratio being disposed between said auxiliary drives and said input shaft of said superposition gear;
an auxiliary drive gear;
a spur gear;
a common spur gear disposed on said input shaft of said superposition gear; and
a clutch;
said respective additional drive connection acting on said spur gear through said auxiliary drive gear;
said additional drive connection acting through said stepped idler gear and through said spur gear on said common spur gear;
said stepped idler gear having an intermediate shaft; and
said clutch disposed on said intermediate shaft and being configured to engage or disengage said spur gear.

2. The apparatus according to claim 1, wherein said main drive machine is operable only at a constant speed and said auxiliary drives are operable at a controlled speed.

3. The apparatus according to claim 1, wherein:
said input shaft is connected with said ring gear;
said output shaft is connected with said sun gear; and
said auxiliary drives are connected with said planet carrier by said respective drive connections having a constant gear ratio.

4. The apparatus according to claim 1, wherein said two auxiliary drives are disposed on a side of said main drive machine.

5. The apparatus according to claim 1, wherein said two auxiliary drives are disposed on a side of said output shaft of said superposition gear.

6. The apparatus according to claim 1, which further comprises a lubricating oil pump, and a spur gear disposed on said input shaft of said superposition gear for driving said lubricating oil pump.

7. The apparatus according to claim 6, which further comprises:
a housing having an upper part and defining x, y and z-directions;
said spur gear being disposed between said main drive machine {4} and said planetary gear train; and
said lubricating oil pump being disposed over said input shaft of said superposition gear in said upper part of said housing in said z-direction.

8. The apparatus according to claim 1, which further comprises:
said one additional drive connection being one of two additional drive connections each being associated with a respective one of said auxiliary drives; and
said additional drive connections being constructed to be respectively coupled or decoupled by said clutch.

9. The apparatus according to claim 1, which further comprises two coupling wheels disposed on said ring gear, and a separate coupling shaft, said additional drive connection acting from said planet carrier with said two coupling wheels through said separate coupling shaft.

10. A drive apparatus, comprising:
a superposition gear having a planetary gear train, an input shaft and an output shaft;
said output shaft configured to be connected to a work machine;
said planetary gear train having a ring gear, a sun gear, a planet carrier and a plurality of planetary gears;
a main drive machine connected to said input shaft of said superposition gear;
two auxiliary drives;
drive connections each connecting a respective one of said auxiliary drives to said planetary gear train, said drive connections of said auxiliary drives each being established through a respective sprocket chain each having a stepped idler gear;
one additional drive connection with a constant gear ratio being disposed between said auxiliary drives and said input shaft of said superposition gear;
an auxiliary gear;
an auxiliary drive shaft;
said additional drive connection acting on said auxiliary drive shaft through said auxiliary gear;
a common spur gear disposed on said input shaft of said superposition gear; and
a spur gear acting on said common spur gear; and
a clutch being disposed on said auxiliary drive shaft and being configured to disengage or engage said auxiliary gear.

11. The apparatus according to claim 10, wherein said main drive machine is operable only at a constant speed and said auxiliary drives are operable at a controlled speed.

12. The apparatus according to claim 10, wherein:
said input shaft is connected with said ring gear;
said output shaft is connected with said sun gear; and
said auxiliary drives are connected with said planet carrier by said respective drive connections having a constant gear ratio.

13. The apparatus according to claim 10, wherein said two auxiliary drives are disposed on a side of said main drive machine.

14. The apparatus according to claim 10, wherein said two auxiliary drives are disposed on a side of said output shaft of said superposition gear.

15. The apparatus according to claim 10, which further comprises a lubricating oil pump, and a spur gear disposed on said input shaft of said superposition gear for driving said lubricating oil pump.

16. The apparatus according to claim 15, which further comprises:
- a housing having an upper part and defining x, y and z-directions;
- said spur gear being disposed between said main drive machine and said planetary gear train; and
- said lubricating oil pump being disposed over said input shaft of said superposition gear in said upper part of said housing in said z-direction.

17. The apparatus according to claim 10, wherein:
- said one additional drive connection being one of two additional drive connections each being associated with a respective one of said auxiliary drives; and
- said additional drive connections being constructed to be respectively coupled or decoupled by said clutch.

18. The apparatus according to claim 10, which further comprises two coupling wheels disposed on said ring gear, and a separate coupling shaft, said additional drive connection acting from said planet carrier with said two coupling wheels through said separate coupling shaft.

* * * * *